United States Patent
Zhang et al.

(10) Patent No.: US 7,502,495 B2
(45) Date of Patent: Mar. 10, 2009

(54) METHOD AND SYSTEM FOR INCREMENTALLY LEARNING AN ADAPTIVE SUBSPACE BY OPTIMIZING THE MAXIMUM MARGIN CRITERION

(75) Inventors: Benyu Zhang, Beijing (CN); Hua-Jun Zeng, Beijing (CN); Jun Yan, Beijing (CN); Wei-Ying Ma, Beijing (CN); Zheng Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 555 days.

(21) Appl. No.: 11/070,382

(22) Filed: Mar. 1, 2005

(65) Prior Publication Data
US 2006/0204081 A1 Sep. 14, 2006

(51) Int. Cl.
G06K 9/00 (2006.01)
(52) U.S. Cl. .......................... 382/118; 382/224
(58) Field of Classification Search .................. 382/118, 382/224
See application file for complete search history.

(56) References Cited

U.S. PATENT DOCUMENTS

| | | | |
|---|---|---|---|
| 7,295,687 B2* | 11/2007 | Kee et al. ..................... | 382/118 |
| 2004/0076329 A1* | 4/2004 | Skarbek et al. .............. | 382/224 |
| 2004/0091152 A1* | 5/2004 | Brand ......................... | 382/224 |
| 2004/0213454 A1* | 10/2004 | Lai et al. ..................... | 382/159 |

OTHER PUBLICATIONS

Yan et al., IMMC: Incremental Maximum Margin Criterion, Aug. 22-25, 2004, IEEE.*

David D. Lewis, Yiming Yang, Tony G. Rose & Fan Li, "RCV1: A New Benchmark Collection for Text Categorization Research," Journal of Machine Learning Research 5 (2004), Published Apr. 2004 (pp. 361-397).

Haifeng Li, Tao Jiang & Keshu Zhang, "Efficient and Robust Feature Extraction by Maximum Margin Criterion", Proceedings of the Advances in Neural Information Processing Systems 16, Vancouver, Canada 2004, MIT Press (18 pages).

Rey-Long Liu & Yun-Ling Lu, "Incremental Context Mining for Adaptive Document Classification," SIGKDD Jul. 23-26, 2002, Edmonton, Alberta, Canada (6 pages).

Juyang Weng, Yilu Zhang & Wey-Shiuan Hwang, "Candid Covariance-Free Incremental Principal Component Analysis," IEEE Transactions on Pattern Analysis and Machine Intelligence, vol. 25, No. 8, Aug. 2003 (pp. 1034-1040).

Lei Yu & Huan Liu, "Efficiently Handling Feature Redundancy in High-Dimensional Data," SIGKDD 2003, Washington DC, Aug. 24-27, 2003, Copyright 2003 ACM (6 pages).

Yilu Zhang & Juyang Weng, "Convergence Analysis of Complementary Candid Incremental Principal Component Analysis," Michigan State University Computer Science Department, Aug. 2001 (7 pages).

Hettich, S. & Blake, C.L. & Merz, C.J., "UCI Repository of machine learning databases," University of California, Irvine, Department of Information and Computer Science, 1998 (2 pages).

* cited by examiner

Primary Examiner—John B Strege
(74) Attorney, Agent, or Firm—Perkins Coie LLP

(57) ABSTRACT

A method and system for generating a projection matrix for projecting data from a high dimensional space to a low dimensional space. The system establishes an objective function based on a maximum margin criterion matrix. The system then provides data samples that are in the high dimensional space and have a class. For each data sample, the system incrementally derives leading eigenvectors of the maximum margin criterion matrix based on the derivation of the leading eigenvectors of the last data sample. The derived eigenvectors compose the projection matrix, which can be used to project data samples in a high dimensional space into a low dimensional space.

20 Claims, 2 Drawing Sheets

METHOD AND SYSTEM FOR INCREMENTALLY LEARNING AN ADAPTIVE SUBSPACE BY OPTIMIZING THE MAXIMUM MARGIN CRITERION

TECHNICAL FIELD

The described technology relates generally to subspace learning and in particular to supervised learning of a subspace.

BACKGROUND

Subspace learning is becoming increasingly important in many applications such as web document classification and face recognition. Some of the most widely used linear subspace learning algorithms are Principal Component Analysis ("PCA"), Linear Discriminant Analysis ("LDA"), and Maximum Margin Criterion ("MMC"). These subspace learning algorithms learn a projection from an original high dimensional space to a low dimensional space. For example, a web document may be represented by a feature vector with an entry for each possible word that can be contained in a web document. Thus, the dimension of the feature vector would be one million if there were one million possible words. It would be impracticable to train a classifier of web documents using training data with such a large feature vector. A subspace learning algorithm, however, can project the training data from a high dimensional space to a low dimensional space so that the training data in the low dimensional space can be used to train a classifier.

PCA is an unsupervised subspace learning algorithm that attempts to find the geometrical structure of the training data and projects the training data along the directions with maximal variances. PCA, however, does not use classification information of the training data. LDA, in contrast, is a supervised subspace learning algorithm that searches for the projection axes on which the data points of different classifications are far from each other while data points in the same classification are close to each other. MMC is also a supervised subspace learning algorithm that has the same goal as LDA. MMC has, however, a much lower computational complexity than LDA because of an objective function that is less complex.

PCA, LDA, and MMC are batch algorithms that require that data be available in advance and be processed together. Many current applications, however, cannot be implemented effectively with a batch algorithm. For example, as classified web documents are received by a classification system, the classification system may want to revise its projection based on the newly received web documents. With a batch algorithm the classification system would need to regenerate the projection matrix using all the data that had been previously received, which can be computationally very expensive. Thus, an incremental technique would be useful to compute the adaptive subspace for data that is received sequentially. One such incremental algorithm is Incremental PCA ("IPCA"). IPCA, however, ignores the classification information, and the features derived by IPCA may not be the most discriminant ones.

LDA generates a linear projection matrix as represented by the following equation:

$$W \in R^{d \times p} \quad (1)$$

where W is the projection matrix and d is the high dimension and p is the low dimension. LDA attempts to maximize the Fisher criterion as represented by the following equation:

$$J(W) = |W^T S_b W| / |W^T S_w W| \quad (2)$$

where $$S_b = \sum_{i=1}^{c} p_i (m_i - m)(m_i - m)^T \quad (3)$$

$$S_w = \sum_{i=1}^{c} p_i E(u_i - m_i)(u_i - m_i)^T \quad (4)$$

where $S_b$ is the inter-class scatter matrix and $S_w$ is the intra-class scatter matrix, where c is the number of classes, m is the mean of all samples, $m_i$ is the mean of the samples belonging to class i, $p_i$ is the prior probability for a sample belonging to class i, $u_i$ is the data samples of class i, and E is the expectation that a given sample is in class i. LDA obtains the projection matrix W by solving the generalized eigenvector decomposition problem as represented by the following equation:

$$S_b w = \lambda S_w w \quad (5)$$

Since there are at most c−1 nonzero eigenvalues, the upper bound of p is c−1. Moreover, at least d+c data samples are required to ensure that $S_w$ is not singular. These constraints limit the application of LDA. Furthermore, it is difficult for LDA to handle a large training set when the dimension of the feature space is high.

MMC uses a different and more computationally efficient objective function or feature extraction criterion. Using the same representation as LDA, the goal of MMC is to maximize the criterion represented by the following equation:

$$J(W) = W^T (S_b - S_w) W \quad (6)$$

The subtraction of the scatter matrices by MMC can be performed in a more computationally efficient manner than the division of the scatter matrices by LDA. Although both MMC and LDA are supervised subspace learning algorithms, the computation of MMC is easier than that of LDA since MMC does not have an inverse operation. The projection matrix w can be obtained by solving the eigenvector decomposition problem represented by the following equation:

$$(S_b - S_w) w = \lambda w \quad (7)$$

Nevertheless, both LDA and MMC are batch algorithms. It would be desirable to have an incremental algorithm that applies the principles of LDA and MMC.

SUMMARY

A method and system for generating a projection matrix for projecting data from a high dimensional space to a low dimensional space. The system establishes an objective function based on a maximum margin criterion matrix. The system then provides data samples that are in the high dimensional space and have a class. For each data sample, the system incrementally derives leading eigenvectors of the maximum margin criterion matrix based on the derivation of the leading eigenvectors of the last data sample. The derived eigenvectors compose the projection matrix, which can be used to project data samples in a high dimensional space into a low dimensional space.

DETAILED DESCRIPTION

Figure 1:
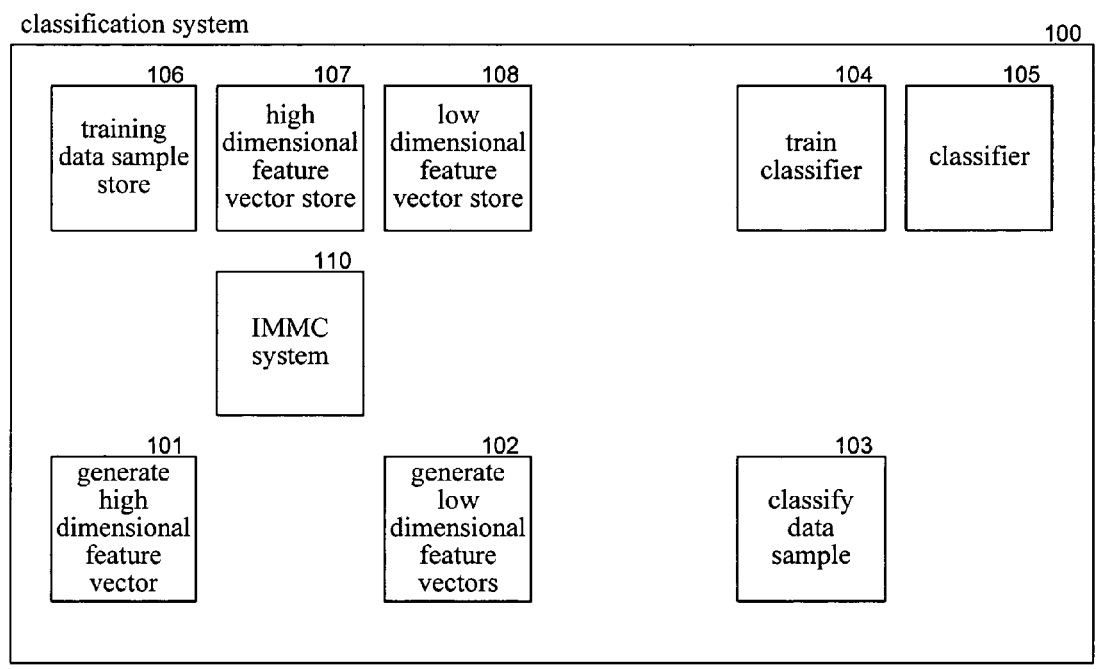
FIG. 1 is a block diagram that illustrates components of a classification system that uses the IMMC system in one embodiment.

A method and system that provides an incremental supervised subspace learning algorithm by incrementally optimizing the maximum margin criterion is provided. In one embodiment, the Incremental MMC ("IMMC") system derives an online adaptive supervised subspace from sequential data samples and incrementally updates eigenvectors of the maximum margin criterion matrix (i.e., projection matrix). The IMMC system does not reconstruct the criterion matrix when it receives a new sample and thus is computationally efficient. The IMMC system establishes an objective function based on the maximum margin criterion. The IMMC system sequentially receives data samples that are in a high dimensional space and that have a classification. For example, the data samples may be feature vectors of the words of web pages and the classifications may represent the topic of the web pages (e.g., history, biology, literature). For each data sample, the IMMC system incrementally derives the leading eigenvectors of the maximum margin criterion matrix based on the derivation of the leading eigenvectors of the previous data sample. The leading eigenvectors compose the projection matrix. When a data sample is received, the IMMC system calculates a vector that is the maximum margin criterion matrix times the eigenvector. The IMMC system derives the vector incrementally from the previous vector calculated using the previous data sample. The IMMC system then derives the leading eigenvector of the maximum margin criterion matrix from the calculated vector. For each subsequent eigenvector, the IMMC system subtracts the projection of the previous eigenvector from the data sample. The IMMC system then calculates the vector that is the maximum margin criterion matrix times the subsequent eigenvector by deriving the calculated vector incrementally from the previously calculated vector. The IMMC system then derives a subsequent eigenvector of the maximum margin criterion matrix from the calculated vector. In this way, the IMMC system incrementally updates the projection matrix as new data samples are received.

In one embodiment, the IMMC system may be used in conjunction with a classifier to classify data samples. The IMMC system can be used to incrementally adjust the projection matrix for projecting feature vectors in a high dimensional space into a low dimensional space. The data samples in the low dimensional space along with their classifications can be used to train the classifier. When a data sample represented by a feature vector with a high dimension is to be classified, the projection matrix generated by the IMMC system can be used to project that feature vector into a low dimensional space. The trained classifier can then be applied to the feature vector in the low dimensional space to classify the data sample. Additionally, the IMMC system may be used in conjunction with a classifier that can be incrementally trained to adjust the classifier as data samples with classifications are processed.

The IMMC system incrementally maximizes the MMC criterion as defined by the following equation:

$$J(W)=W^T(S_b-S_w)W \qquad (8)$$

where $S_b$ and $S_w$ are the inter-class scatter matrix and intra-class scatter matrix, respectively, and $W \in R^{d \times p}$ is the projection matrix from original, high dimensional space to the low dimensional space. The IMMC system assumes that W consists of unit vectors as defined by the following equations:

$$W=[w_1, w_2, \ldots w_p] \qquad (9)$$

$$w_k^T w_k = 1 \qquad (10)$$

The IMMC system represents the optimization problem of the proposed objective function J(W) as a constrained optimization problem as indicated by the following equation:

$$\max \sum_{k=1}^{p} w_k^T (S_b - S_w) w_k \qquad (11)$$

where $w_k^T w_k = 1$ and $k=1, 2, \ldots, p$. The first k leading eigenvectors of the matrix $S_b - S_w$ and the column vectors of W are orthogonal to each other. Thus, the IMMC system finds the solution by learning the p leading eigenvector of $S_b - S_w$ incrementally.

The IMMC system transforms the criterion matrix to a more convenient form based on the following lemmas:

$$S_b + S_w = C \qquad (1)$$

$$\text{if } \lim_{n \to \infty} a_n = a \text{ then } \lim_{n \to \infty} \frac{1}{n} \sum_{i=1}^{n} a_i = a \qquad (2)$$

where C is the covariance matrix. The goal of the IMMC system is to maximize the maximum margin criterion as indicated by Equation 8. The IMMC system transforms the maximum margin criterion using Lemma 1 to the following equation:

$$J(W)=W^T(2S_b-C)W \qquad (12)$$

where C is the covariance matrix. Thus, the IMMC system maximizes the objective function J(W) by finding the p leading eigenvectors of $2S_b - C$.

The IMMC defines the inter-class scatter matrix of step n after learning from the first n samples by the following equation:

$$S_b(n) = \sum_{i=1}^{c} p_i(n)(m_i(n) - m(n))(m_i(n) - m(n))^T \qquad (13)$$

where c is the number of classes, m is the mean of all samples, $m_i$ is the mean of the samples belonging to class i, and $p_i$ is the prior probability for a sample belonging to class i. The IMMC system represents the inter-class scatter matrix by the following equation:

$$S_b = \lim_{n\to\infty} \frac{1}{n}\sum_{i=1}^{n} S_b = (i) \quad (14)$$

since $$\lim_{n\to\infty} S_b(n) = S_b$$

and by applying Lemma 2. The IMMC system represents the covariance matrix by the following equation:

$$C = E\{(u(n) - m)(u(n) - m)^T\} \quad (15)$$

$$= \lim_{n\to\infty} \frac{1}{n}\sum_{i=1}^{n} (u(n) - m(n))(u(n) - m(n))^T$$

where $\{u_{ln}(n)\}$ represents the data sample sequence and n represents the $n^{th}$ data sample. If θ is a positive real number, $I \in R^{d \times d}$ is an identity matrix, λ is an eigenvalue of matrix A, and x is the corresponding eigenvector, then the identity holds as represented by the following equation:

$$(A+\theta I)x = Ax + \theta I x = (\lambda + \theta)x \quad (16)$$

where A should have the same eigenvectors with matrix A+θI. The order from the largest to the smallest of their corresponding eigenvalues is the same. Therefore, $2S_b - C$ should have the same eigenvectors as $2S_b - C + \theta I$. The objective function can be represented by the following equations:

$$2S_b - C + \theta I = \lim_{n\to\infty} \frac{1}{n}\sum_{i=1}^{n} \left( \begin{array}{c} 2S_b(i) - (u(i) - m(i)) \\ (u(i) - m(i))^T + \theta I \end{array} \right) \quad (17)$$

$$= \lim_{n\to\infty} \frac{1}{n}\sum_{i=1}^{n} A(i) = A$$

where $A(i) = 2S_b(i) - (u(i) - m(i))(u(i) - m(i))^T + \theta I$ (18)

$$A = 2S_b - C + \theta I \quad (19)$$

If the IMMC system considers matrix A(i) to be a random matrix, then the expectations can be represented by the following equation:

$$E\{A(n)\} = \lim_{n\to\infty} \frac{1}{n}\sum_{i=1}^{n} A(i) \quad (20)$$

The IMMC system represents the general eigenvector form by the following equation:

$$Ax = \lambda x \quad (21)$$

where x is the eigenvector of matrix A corresponding to the eigenvalue λ. The IMMC system replaces matrix A with the maximum margin criterion matrix at step n to represent an approximate iterative eigenvector computation of the following equation:

$$v(n) = \frac{1}{n}\sum_{i=1}^{n}(2S_b(i) - (u(i) - m(i))(u(i) - m(i))^T + \theta I)x(i) \quad (22)$$

$$= \frac{1}{n}\sum_{i=1}^{n}\left(2\sum_{j=1}^{c} p_j(i)\Phi_j(i)\Phi_j(i)^T - (u(i) - m(i))(u(i) - m(i))^T + \theta I\right)x(i)$$

where $v=\lambda x$, $\Phi_j(i) = m_j(i) - m(i)$, v(n) is the $n^{th}$ step estimation of v, and x(n) is the $n^{th}$ step estimation of x. Once the IMMC system estimates v, the IMMC system directly computes the eigenvector as represented by the following equation:

$$x = v/\|v\| \quad (23)$$

Thus, the eigenvector can be represented incrementally by the following equation:

$$x(i) = v(i-1)/\|v(i-1)\| \quad (24)$$

The IMMC system represents the incremental formulation by the following equation:

$$v(n) = \frac{n-1}{n}v(n-1) + \frac{1}{n}\left(2\sum_{j=1}^{c} p_j(n)\Phi_j(n)\Phi_j(n)^T - \right. \quad (25)$$

$$(u(n) - m(n))(u(n) - m(n))^T + \theta I)v(n-1)/\|v(n-1)\|$$

$$= \frac{n-1}{n}v(n-1) + \frac{1}{n}\left(2\sum_{j=1}^{c} p_j(n)\alpha_j(n)\Phi_j(n) - \right.$$

$$\beta(n)(u(n) - m(n)) + \theta v(n-1))/\|v(n-1)\|$$

where $\alpha_j(n) = \Phi_j(n)^T v(n-1)$, $\beta(n) = (u(n) - m(n))^T v(n-1)$, and j=1,2, . . . ,c. The IMMC system initializes the formulation using the following equation:

$$v(0) = u(1) \quad (26)$$

where u(1) represents the first data sample.

Since the different eigenvectors are orthogonal to each other, the IMMC system generates "observations" only in a complementary space for the computation of the higher order eigenvectors. To compute the $(j+1)^{th}$ eigenvector, the IMMC system first subtracts its projection on the estimated $j^{th}$ eigenvector from the data as represented by the following equation:

$$u_{ln}^{j+1}(n) = u_{ln}^{j}(n) - (u_{ln}^{j}(n)^T v^j(n))v^j(n) \quad (27)$$

where $u_{ln}^{1}(n) = u_{ln}(n)$. The IMMC system updates $m_i^j$ and $m^j(n)$ i=1,2, . . . ,c in a similar manner. Since $m_i^j(n)$ and $m^j(n)$ are linear combinations of $x_{li}^j(i)$, where i=1,2, . . . ,n, j=1, 2, . . . , k, and $I_i \in \{1, 2, \ldots, C\}$, Φ is a linear combination of $m_i$ and m. For convenience, the IMMC system can update Φ at each iteration step by the following equation:

$$\Phi_{ln}^{j+1}(n) = \Phi_{ln}^{j}(n) - (\Phi_{ln}^{j}(n)^T v^j(n))v^j(n) \quad (28)$$

Thus, the IMMC system can avoid time-consuming orthonormalization. The IMMC system uses Equation 27 at each step to derive the eigenvectors of the maximum margin criterion matrix one by one, which is more efficient than an orthonormalization process.

FIG. 1 is a block diagram that illustrates components of a classification system that uses the IMMC system in one embodiment. The classification system 100 includes a generate high dimensional feature vector component 101, a generate low dimensional feature vector component 102, a classify data sample component 103, a train classifier component 104, a classifier 105, and an IMMC system 110. The classification system also includes a training data sample store 106, a high dimensional feature vector store 107, and a low dimensional feature vector store 108. The training data sample store may be used to store training data samples as they are sequentially received by the classification system. When a training data sample is received (e.g., a web document and its classification), the classification system invokes the generate high dimensional feature vector component to generate a feature vector for the training data sample and stores the feature vector in the high dimensional feature vector store. The classification system invokes the IMMC system to incrementally update the projection matrix that is used to project the high dimensional space to the low dimensional space. The classification system may invoke the generate low dimensional feature vector component to generate a low dimensional feature vector from a high dimensional feature vector using the projection matrix. When sufficient training data samples have been received, the train classifier component trains the classifier using the low dimensional feature vectors and the classifications of the training data samples. After the classifier is trained, the classify data sample component can be used to classify data samples. When the classification system receives an unclassified data sample, it invokes the classify data sample component. The classify data sample component may invoke the generate high dimensional feature vector component and then the generate low dimensional feature vector component to generate the low dimensional feature vector for the unclassified data sample. The classify data sample component invokes the classifier, passing the low dimensional feature vector to generate the classification for the data sample.

The computing device on which the IMMC system is implemented may include a central processing unit, memory, input devices (e.g., keyboard and pointing devices), output devices (e.g., display devices), and storage devices (e.g., disk drives). The memory and storage devices are computer-readable media that may contain instructions that implement the IMMC system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the IMMC system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The IMMC system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
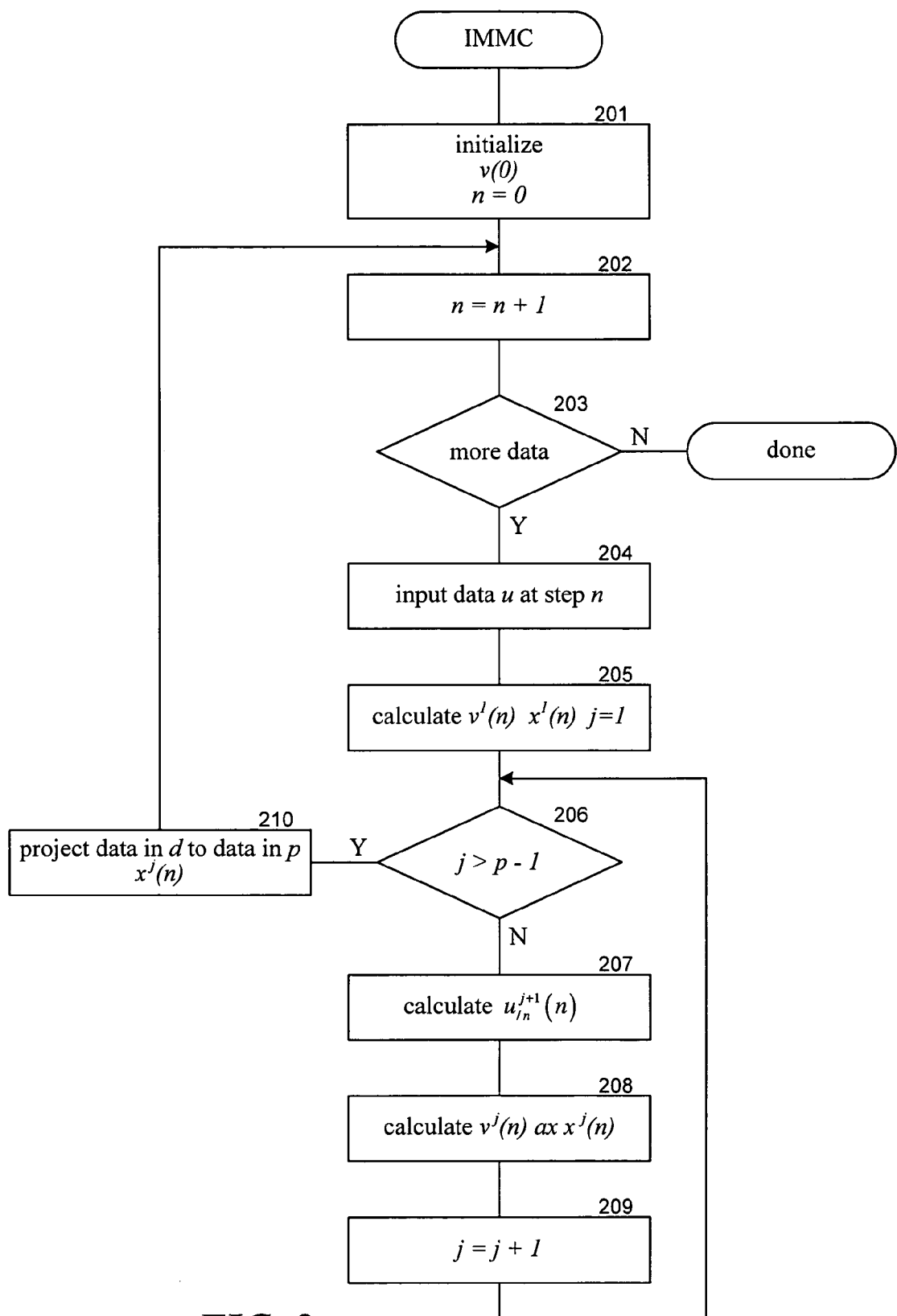
FIG. 2 is a flow diagram that illustrates the processing of the IMMC system, which is a component of the classification system, in one embodiment.

FIG. 2 is a flow diagram that illustrates the processing of the IMMC system, which is a component of the classification system, in one embodiment. In block 201, the component initializes a calculated vector to the first training data sample and the step count to zero. In blocks 202-209, the component loops sequentially processing each training data sample. In block 202, the component increments the step count. The step count represents the number of training data samples that have been used to incrementally update the projection matrix. In decision block 203, if there are more training data samples, the component continues at block 204, else the component completes. In block 204, the component inputs the next training data sample. In block 205, the component calculates the vector corresponding to the leading eigenvector according to Equation 25. The component also calculates the subsequent eigenvector using Equation 25. The component also initializes the counter to track the number of leading eigenvectors that have been processed. In blocks 206-209, the component loops deriving the leading eigenvectors for the maximum margin criterion matrix. In decision block 206, if sufficient leading eigenvectors have been derived, then the component continues at block 210, else the component continues at block 207. In block 207, the component generates an updated training data sample by subtracting out the projection of the previously derived eigenvector using Equation 27. In block 208, the component calculates the vector for the next eigenvector and derives the next eigenvector. In block 209, the component increments the count of eigenvectors that have been derived and loops to block 206. In block 210, the component may optionally use the derived eigenvectors as a projection matrix to project the selected training data sample from the high dimensional space to the low dimensional space. The component then loops to block 202 to process the next training data sample.

From the foregoing, it will be appreciated that specific embodiments of the IMMC system have been described herein for purposes of illustration, but that various modifications may be made without deviating from the spirit and scope of the invention. One skilled in the art will appreciate that the principles of the IMMC can be applied to create an incremental LDA algorithm. Accordingly, the invention is not limited except as by the appended claims.

We claim:

1. A method in a computer system for incrementally updating a projection matrix for projecting data from a high dimensional space to a low dimensional space, the method comprising:

using a computer to carry out the steps of:

establishing an objective function based on a maximum margin criterion matrix;

providing data samples, each data sample being in the high dimensional space and having a class; and for each data sample, calculating a vector that is the maximum margin criterion matrix times the eigenvector, the calculated vector being derived incrementally from the vector calculated for the previous data sample;

deriving the leading eigenvector of the maximum margin criterion matrix from the calculated vector; and for each subsequent eigenvector, successively subtracting the projection of the previously derived eigenvector from the data sample;

calculating a vector that is the maximum margin criterion matrix times the subsequent eigenvector, the calculated vector being derived incrementally from the previously calculated vector; and deriving the subsequent eigenvector of the maximum margin criterion matrix from the calculated vector wherein the derived eigenvectors compose the projection matrix.

2. The method of claim 1 wherein the objective function is represented by the following equation:

$$J(W)=W^T(S_b-S_w)W.$$

3. The method of claim 1 wherein the vector is calculated according to the following equation:

$$v(n) = \frac{n-1}{n}v(n-1) + \frac{1}{n}\left(2\sum_{j=1}^{c}p_j(n)\Phi_j(n)\Phi_j(n)^T - \right.$$

$$(u(n)-m(n))(u(n)-m(n))^T + \theta I)v(n-1)/\|v(n-1)\|$$

$$= \frac{n-1}{n}v(n-1) + \frac{1}{n}\left(2\sum_{j=1}^{c}p_j(n)\alpha_j(n)\Phi_j(n) - \right.$$

$$\beta(n)(u(n)-m(n)) + \theta v(n-1))/\|v(n-1)\|$$

4. The method of claim 1 wherein the subtracting of the projection is based on the following equation:

$$u_{ln}^{j+1}(n)=u_{ln}^{j}(n)-(u_{ln}^{j}(n)^T v^j(n))v^j(n).$$

5. The method of claim 1 wherein an eigenvector is derived for each dimension of the low dimensional space.

6. The method of claim 1 including multiplying the projection matrix times a data sample to project the data sample to the low dimensional space.

7. The method of claim 1 including training a classifier using projected data samples.

8. The method of claim 1 including classifying a data sample provided in the high dimensional space by applying the projection matrix to project the data sample into the low dimensional space and applying the classifier to the data sample in the low dimensional space to generate the classification of the data sample.

9. The method of claim 1 wherein the calculated vector is initialized to the first data sample.

10. A method in a computer system for generating a projection matrix for projecting data from a high dimensional space to a low dimensional space, the method comprising:
using a computer to carry out the steps of:
establishing an objective function based on a maximum margin criterion matrix;
providing data samples, each data sample being in the high dimensional space and having a class; and
for each data sample, incrementally deriving leading eigenvectors of the maximum margin criterion matrix based on the derivation of the leading eigenvectors of the last data sample wherein the derived eigenvectors compose the projection matrix.

11. The method of claim 10 wherein incrementally deriving includes for each data sample:
deriving the leading eigenvector; and
for each subsequent eigenvector, deriving the next eigenvector of the maximum margin criterion matrix from the previously derived eigenvector.

12. The method of claim 11 wherein the deriving of the next eigenvector includes successively subtracting the projection of the last derived eigenvector from the data sample and calculating a vector that is the maximum margin criterion matrix times the next eigenvector.

13. The method claim 10 wherein the objective function is represented by the following equation:

$$J(W)=W^T(S_b-S_w)W.$$

14. The method of claim 10 wherein a leading eigenvector is derived for each dimension of the low dimensional space.

15. The method of claim 10 including multiplying the projection matrix times a data sample to project the data sample to the low dimensional space.

16. The method of claim 10 including training a classifier using projected data samples.

17. The method of claim 16 including classifying a data sample provided in the high dimensional space by applying the projection matrix to project the data sample into the low dimensional space and applying the classifier to the data sample in the low dimensional space to generate the classification of the data.

18. A computer system for generating a projection matrix for projecting data from a high dimensional space to a low dimensional space, comprising:
means for providing data samples, each data sample being in the high dimensional space and having a class; and
means for incrementally deriving leading eigenvectors of a maximum margin criterion matrix for each data sample based on the derivation of the leading eigenvectors of the previous data sample wherein the derived eigenvectors compose the projection matrix.

19. The system of claim 18 wherein the means for incrementally deriving includes for each data sample means for deriving the leading eigenvector and means for deriving the next eigenvector of the maximum margin criterion matrix from the previously derived eigenvector.

20. The system of claim 18 wherein the means for deriving of the next eigenvectors includes means for subtracting the projection of the previously derived eigenvector from the data sample and means for calculating a vector that is the maximum margin criterion matrix times the next eigenvector.

* * * * *